United States Patent
Cohen

(10) Patent No.: US 9,654,024 B2
(45) Date of Patent: May 16, 2017

(54) AC-DC CONVERTER HAVING SOFT-SWITCHED TOTEM-POLE OUTPUT

(71) Applicant: Texas Instruments Incorporated, Dallas, TX (US)

(72) Inventor: Isaac Cohen, Dix Hills, NY (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 14/285,441

(22) Filed: May 22, 2014

(65) Prior Publication Data

US 2014/0355319 A1    Dec. 4, 2014

Related U.S. Application Data

(60) Provisional application No. 61/829,086, filed on May 30, 2013.

(51) Int. Cl.
*H02M 7/217* (2006.01)
*H02M 7/219* (2006.01)
(Continued)

(52) U.S. Cl.
CPC .... *H02M 7/217* (2013.01); *H02M 2001/0009* (2013.01); *H02M 2001/0058* (2013.01); *Y02B 70/1491* (2013.01)

(58) Field of Classification Search
CPC ................. H02M 7/217; H02M 7/219; H02M 2001/0051; H02M 2001/0058; H02M 1/4233; Y02B 70/1491
(Continued)

(56) References Cited

U.S. PATENT DOCUMENTS

| | | | | | |
|---|---|---|---|---|---|
| 5,063,490 A | * | 11/1991 | Maehara | .............. | H05B 41/392 |
| | | | | | 315/105 |
| 5,943,225 A | * | 8/1999 | Park | ........................ | H02M 1/34 |
| | | | | | 363/126 |

(Continued)

FOREIGN PATENT DOCUMENTS

| SU | 892558 A | 12/1981 |
|---|---|---|
| SU | 1499428 A1 | 8/1989 |

OTHER PUBLICATIONS

PCT Search Report mailed Oct. 23, 2014.
SU892558A, English Machine Translation.
SU1499428A1, English Machine Translation.

*Primary Examiner* — Timothy J Dole
*Assistant Examiner* — Sisay G Tiku
(74) *Attorney, Agent, or Firm* — Lawrence J. Bassuk; Charles A. Brill; Frank D. Cimino

(57) ABSTRACT

An AC-DC converter has a totem-pole output circuit having first and second semiconductor switches, each having a channel coupled to a switching node and having a parasitic capacitance associated with the channel. An inductor has one terminal thereof connected to a switching node. First and second bypass devices are coupled to a second terminal of the inductor and operable during at least a portion of an input voltage to allow reverse current from an output of the converter to generate soft-switching of the first semiconductor switch. An asymmetrical shunt for measuring current in a first direction and bypassing current in a second direction opposite the first direction allows accurate measurement of reverse current.

5 Claims, 13 Drawing Sheets

(51) Int. Cl.
   *H02M 7/162* (2006.01)
   *H02M 1/00* (2006.01)
   *H02M 1/42* (2007.01)

(58) Field of Classification Search
   USPC .......................... 323/235, 238, 239; 363/127
   See application file for complete search history.

(56) References Cited

U.S. PATENT DOCUMENTS

| | | | | |
|---|---|---|---|---|
| 5,982,645 | A * | 11/1999 | Levran et al. | ................. 363/37 |
| 6,108,225 | A * | 8/2000 | Iwahori | ................. H02M 7/217 |
| | | | | 363/132 |
| 6,288,814 | B1 * | 9/2001 | Blauvelt | ............... H03F 1/3252 |
| | | | | 398/193 |
| 6,738,274 | B2 * | 5/2004 | Prasad | ................. H02M 1/4225 |
| | | | | 323/207 |
| 7,215,560 | B2 * | 5/2007 | Soldano | ............. H02M 1/4225 |
| | | | | 363/44 |
| 7,440,300 | B2 * | 10/2008 | Konishi et al. | ............... 363/132 |
| 7,466,829 | B1 * | 12/2008 | Anderson | ................. H03G 7/002 |
| | | | | 381/103 |
| 7,605,570 | B2 * | 10/2009 | Liu | .................... H02M 1/4208 |
| | | | | 323/207 |
| 8,289,737 | B2 * | 10/2012 | Wildash | ................. H02M 1/44 |
| | | | | 363/125 |
| 8,385,032 | B1 * | 2/2013 | Mao | .................... H02M 1/4225 |
| | | | | 361/111 |
| 8,508,964 | B2 * | 8/2013 | Gray | ................. H02M 7/53875 |
| | | | | 363/132 |
| 8,867,248 | B2 * | 10/2014 | Wang | .......................... 363/132 |
| 9,270,166 | B2 * | 2/2016 | Wang | ................. H02M 1/4225 |
| 2002/0047693 | A1 | 4/2002 | Chang | |
| 2003/0043607 | A1 | 3/2003 | Vinciarelli et al. | |
| 2009/0168476 | A1 * | 7/2009 | Moon | ................. H02M 1/4225 |
| | | | | 363/89 |
| 2010/0149846 | A1 * | 6/2010 | Tan et al. | ..................... 363/132 |
| 2011/0134671 | A1 * | 6/2011 | Balocco | ....................... 363/126 |
| 2012/0069615 | A1 * | 3/2012 | Tomioka | ............. H02M 1/4208 |
| | | | | 363/126 |
| 2012/0127765 | A1 * | 5/2012 | Maruyama et al. | ........... 363/126 |
| 2012/0262954 | A1 * | 10/2012 | Duvnjak | ............. H02M 1/4258 |
| | | | | 363/21.02 |
| 2013/0077365 | A1 * | 3/2013 | Chalermboon | ..... H02M 1/4208 |
| | | | | 363/89 |
| 2014/0098584 | A1 * | 4/2014 | Gucyski | ............. H02M 1/4266 |
| | | | | 363/126 |
| 2014/0277680 | A1 * | 9/2014 | Youngquist | ............ G05B 11/01 |
| | | | | 700/121 |

* cited by examiner

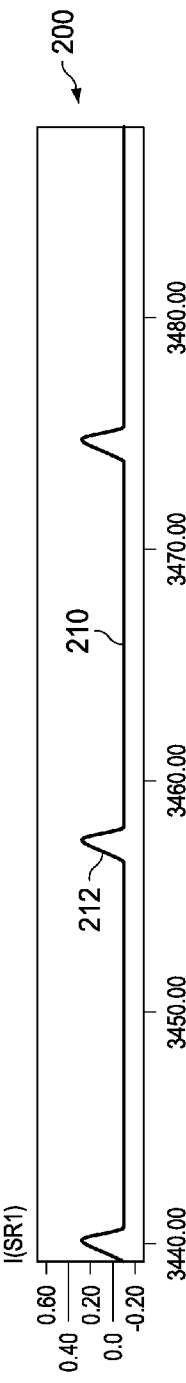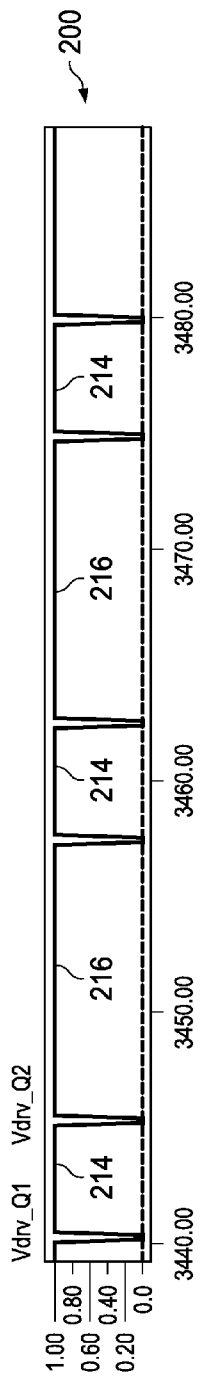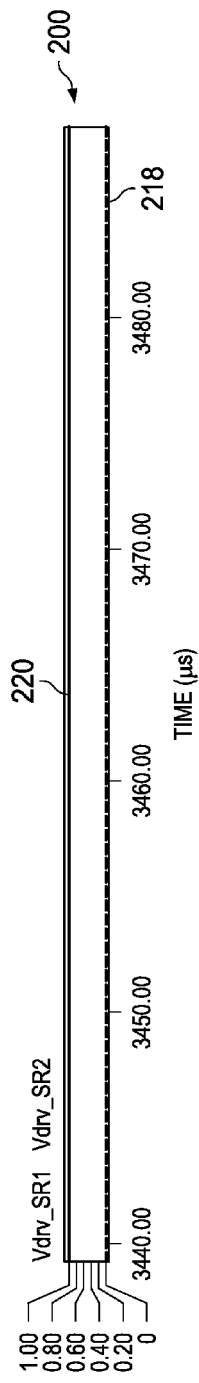

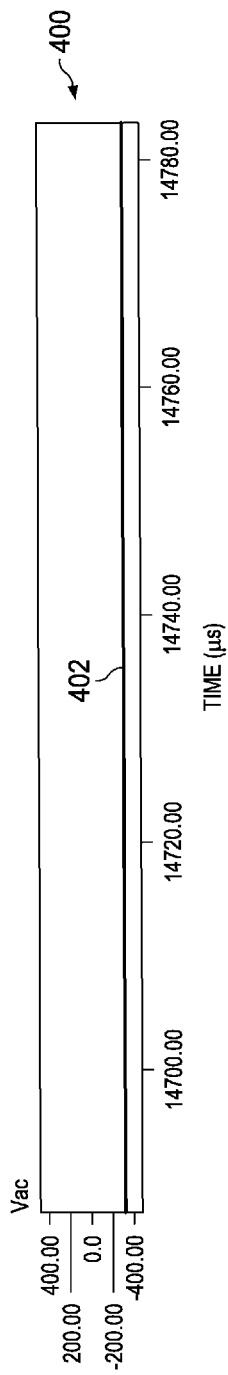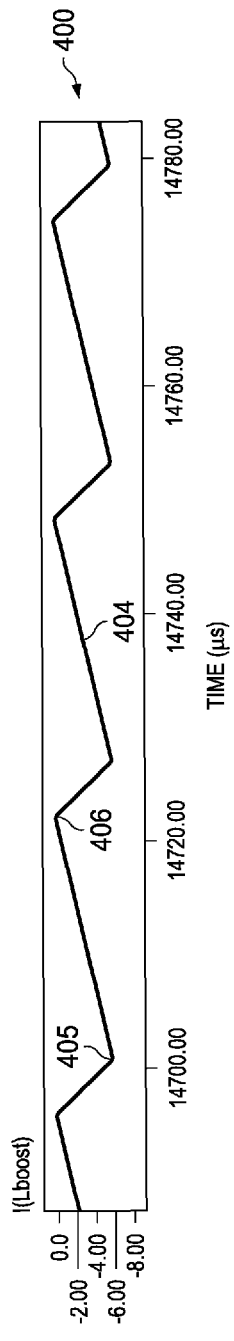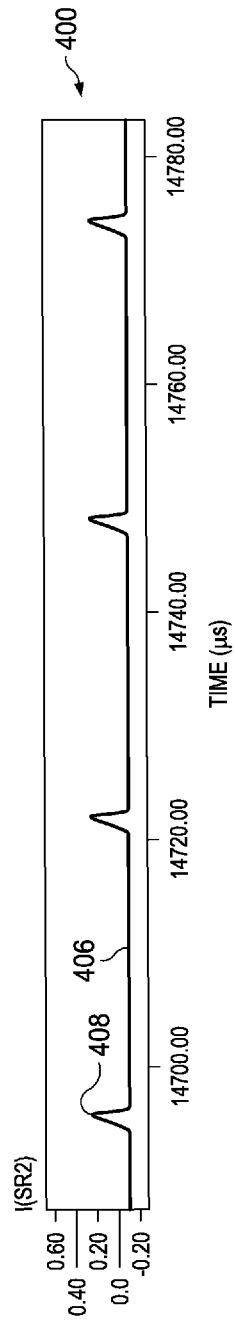

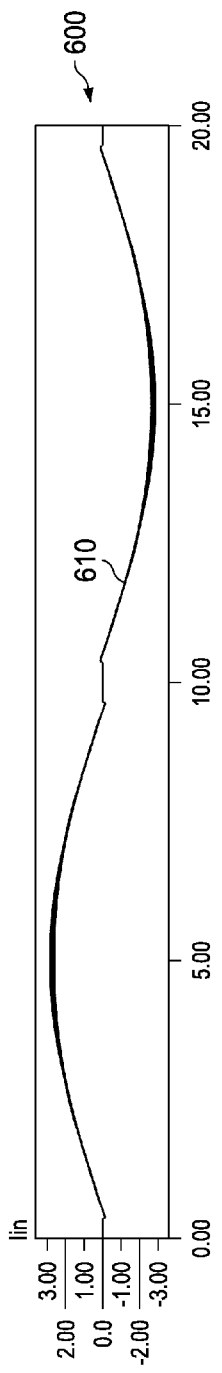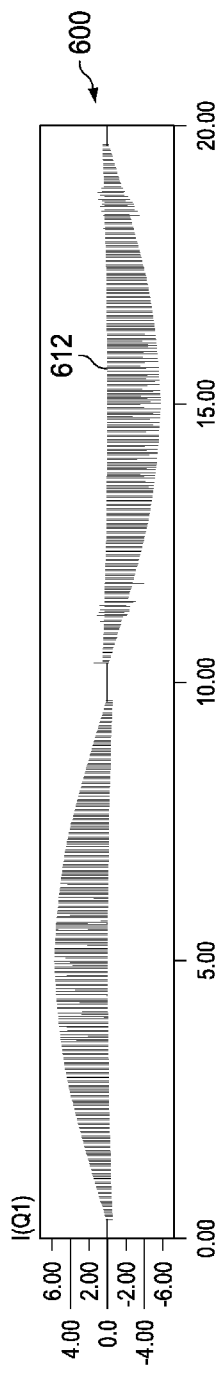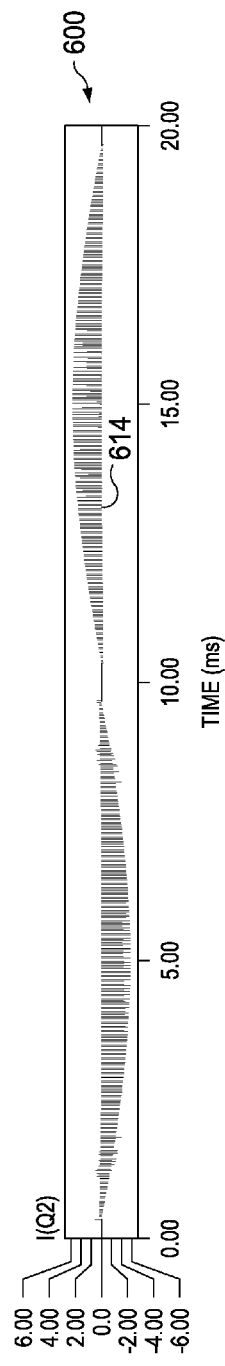

AC-DC CONVERTER HAVING SOFT-SWITCHED TOTEM-POLE OUTPUT

CROSS-REFERENCE TO RELATED APPLICATIONS

This patent application claims priority from U.S. Provisional Application No. 61/829,086, filed May 30, 2013, which is incorporated herein by reference in its entirety for all purposes.

FIELD OF THE INVENTION

The invention relates to an AC-DC converter and more specifically to a bridgeless AC-DC converter having a totem-pole output.

BACKGROUND OF THE INVENTION

Bridgeless AC-DC converters are known in the art. Conventional bridgeless circuits operating in the transition mode (TM) suffer from high switching losses and a very high common mode EMI. In addition they make poor utilization of their magnetic components and semiconductor devices. Totem-pole output bridgeless circuits, when operated in continuous conduction mode (CCM), have reduced common mode EMI but are only practical with GaN devices because of the slow reverse recovery of the body diode of silicon semiconductors. If these devices operate in the transition mode (TM) with what is known as "valley switching," the reverse recovery problem is resolved but they may have significant switching losses at high input line. Both the CCM and TM totem-pole bridgeless circuits present current and voltage sensing challenges.

Thus, there is a need for a new bridge was AC-DC converter circuit having a totem-pole output operating in or near transition mode.

SUMMARY OF THE INVENTION

It is a general object of the invention to provide a bridgeless AC-DC converter having a totem-pole output.

This and other objects are achieved by an aspect comprising an AC-DC converter comprising a totem-pole output circuit having first and second semiconductor switches, each having a channel coupled to a switching node and having a parasitic capacitance associated with the channel. An inductor has one terminal thereof connected to a switching node. A first bypass device is coupled to a second terminal of the inductor and is operable during at least a portion of a positive cycle of an input voltage to allow reverse current from an output of the AC-DC converter to generate soft-switching of the first semiconductor switch. A second bypass device is coupled to the second terminal of the inductor and is operable during at least a portion of a negative cycle of the input voltage to allow reverse current from the output of the AC-DC converter to generate soft-switching of the second semiconductor switch.

Another aspect includes a method of operating an AC-DC converter having a totem-pole output stage comprising first and second semiconductor switches each having a parasitic capacitance associated with a channel thereof. A first semiconductor switch is operated to store energy in an inductor. The second semiconductor switch and a bypass device operated to allow reverse current to flow from an output of the converter to discharge the parasitic capacitances and allow for soft-switching of the first and second semiconductor switches.

A further aspect is provided by an AC-DC converter comprising a first semiconductor switch, having a channel coupled between output rail and a switching node and having a parasitic capacitance associated with the channel. A second semiconductor switch has a channel coupled between a reference voltage rail and switching node and has a parasitic capacitance associated with the channel. An inductor is coupled between the switching node and one terminal of the input voltage source. A first bypass device is coupled between the output rail and a second terminal of the input voltage source. A second bypass device is coupled between the second terminal of the input voltage source and the reference voltage rail, the first and second bypass devices being operable during positive and negative portions of the input voltage, respectively, to allow a reverse current to flow to generate soft-switching of the first and second semiconductor switches.

BRIEF DESCRIPTION OF DRAWINGS

Further aspects of the invention will appear from the appending claims and from the following detailed description given with reference to the appending drawings.

FIGS. 2A-2F show operating waveforms of the AC-DC converter shown in FIG. 1;

FIGS. 4A-4F show operating waveforms during a negative portion of the AC cycle;

FIGS. 6A-6G show the operating waveforms for the AC-DC converter on a larger scale.

DETAILED DESCRIPTION OF EXAMPLE EMBODIMENTS

Figure 1:
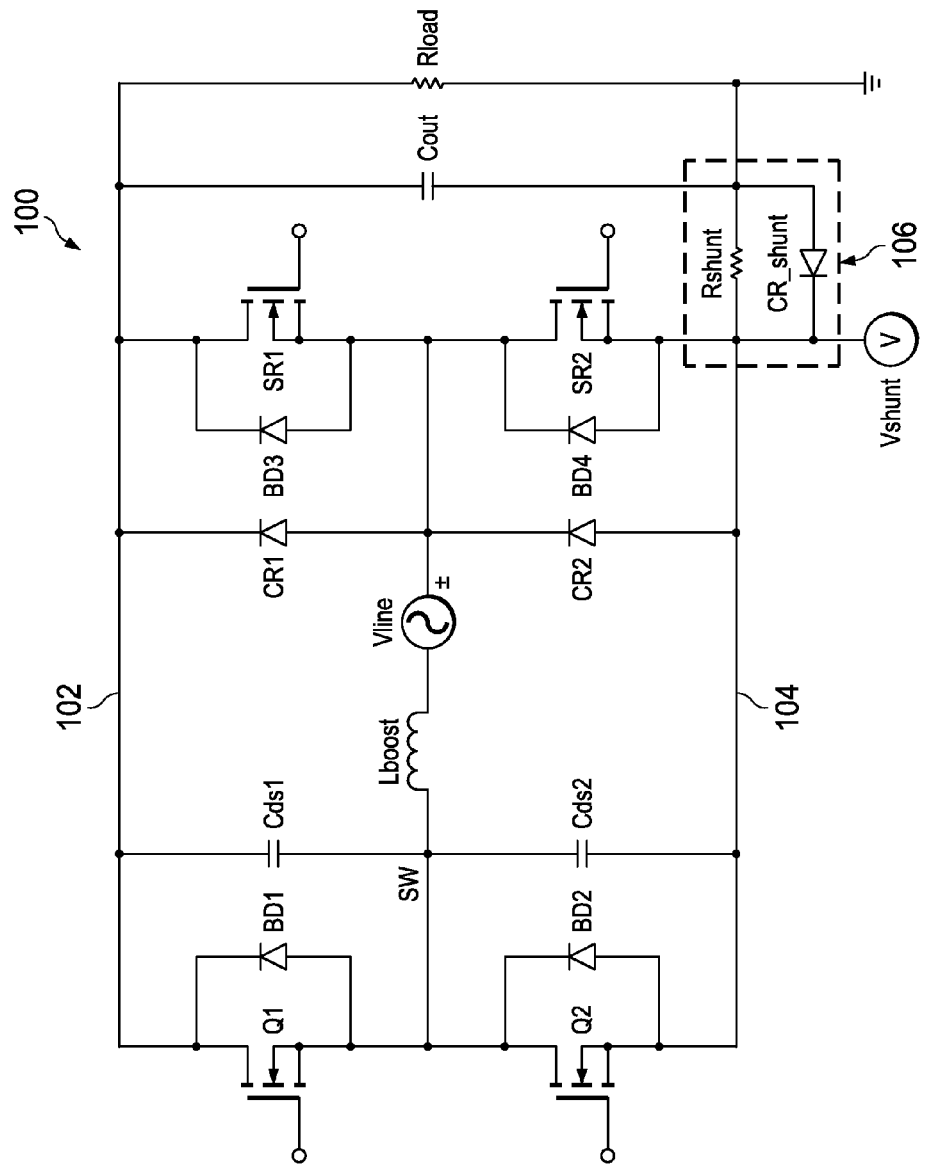
FIG. 1 is a schematic of a bridgeless totem-pole AC-DC converter in accordance with the present invention.

FIG. 1 shows a boost AC-DC converter having a totem-pole output generally as 100. The totem-pole output comprises two NMOS transistors Q1, Q2 in series between the output rail 102 and reference rail 104. It is to be understood that these transistors are for illustrative purposes only and other types of transistors including PMOS, IGBT and bipolar transistors could also be used. The drain of transistor Q1 is connected to the output voltage rail 102 and the source of that transistor is connected to a switching node SW. The drain of transistor Q2 is connected to the switching node SW and its source is connected to the reference voltage rail 104. Each of the transistors has a parasitic body diode BD1 and BD2, respectively, which are parallel to the drain-source channel. Each of the transistors also has an associated parasitic capacitance between its drain and source which are in parallel with the drain-source channel of the transistors. Transistor Q1 has a parallel parasitic capacitance $CdS_1$ and transistor Q2 has a parallel parasitic capacitance CdS2.

The switching node SW is connected to one terminal of a boost inductor Lboost the other terminal of which is connected to one terminal of the line voltage source Vline. The other terminal of the line voltage source Vline is connected to a pair of bypass devices, here shown as synchronous rectifiers SR1 and SR2. Other types of switching devices can also be used. The bypass device SR1 is connected between the second terminal of the line voltage source and the output rail 102. The bypass device SR2 is connected between the second terminal of the line voltage source and the reference voltage rail 104. Each of the bypass devices SR1, SR2 has an associated parasitic body diode BD3 and BD4, respectively. BD3 is in parallel with SR1 between the output voltage rail 102 and the second terminal of the line voltage supply Vline, and blocks current flow from the output voltage rail 102 to the second terminal of the input voltage Vline. BD4 is in parallel with SR2 between the second terminal of the input voltage supply Vline and the reference voltage rail 104, and blocks current flow from the second terminal of Vline to the reference voltage rail 104.

In parallel with the parasitic body diodes BD3 and BD4, are optional rectifier diodes CR1 and CR2 which block current in the same direction as the body diodes BD3 and BD4, respectively. The bypass devices SR1 and SR2 can be lower-cost MOSFETs, for example, because they will only be switching a small amount of current, for a short time duration, and switch at the line frequency. If large enough devices are chosen for SR1 and SR2, then the diodes CR1 and CR2 are not needed. However, if it is desirable to reduce the cost of the bypass devices SR1 and SR2, smaller devices can be chosen, in which case the diodes CR1 and CR2 are necessary.

A capacitor Cout his coupled between the output voltage rail 102 and the reference voltage rail 104 in parallel with the bypass devices SR1, SR2 and the diodes CR1, CR2. A load, here shown as a resistor Rload is coupled in parallel with the capacitor Cout. Although load is shown as a resistor, other types of loads having a reactive component can be utilized as well. In fact, boost converters can be utilized as power factor correction (PFC) circuits in which the drive for the transistors is controlled so that the input current and input voltage are in phase so that the load appears as a resistor, even though it may have reactive components. The use of a boost AC-DC converter for power factor correction is well known to those skilled in the art and is well documented. Therefore, it is not necessary to provide details herein regarding this use of a boost converter. An asymmetrical shunt 106 is coupled in series with the output capacitor and the load and comprises a resistor Rshunt in parallel with a diode CR_shunt. The diode is connected such that it conducts for current flowing into the capacitor Cout and blocks current flowing in the opposite direction.

Operation of the circuit will now be described in which the switching of the totem-pole transistors Q1 and Q2 will be done with "soft-switching". It should be noted that the term "soft-switching" is commonly equated with the term "zero voltage switching (ZVS)". The term "zero voltage switching" does not necessarily imply that the voltage across the transistor is actually reduced to zero. A much smaller reduction in voltage will produce greatly beneficial results. The power dissipated by the transistor is proportional to the square of the voltage across the transistor when the switching occurs. Therefore, throughout this application, the term "soft-switching" has been utilized to indicate a ZVS condition in which the voltage across the transistor may not necessarily be reduced to zero.

In the following explanation, it is assumed that the AC input voltage Vline is positive on its right side, that is where the "+" sign appears in FIG. 1. In operation, totem-pole transistor Q1 is turned on to build current in the inductor in the positive direction. Totem-pole transistor Q2 is off. During the positive portion of the AC input voltage on Vline, bypass device SR1 is turned on and bypass device SR2 to is turned off. Current flows from the positive input voltage, through the bypass device SR1, transistor Q1 and through inductor Lboost to the negative terminal of the line voltage supply Vline. Once the inductor current has reached the desired level, the transistor Q1 is turned off. Current continues to flow through the inductor Lboost utilizing the parasitic capacitor Cds2 and the diode CR1 and/or bypass switch SR1 to complete the path, with a small portion of the current going through the body diode BD2, allowing the inductor to discharge into the output capacitor Cout. This will discharge the voltage across the parasitic capacitor Cds2 until it reaches approximately 0V. At this time transistor Q2 can be soft-switched on without switching losses achieving ZVS, since the voltage across the capacitor Cds2 is approximately 0 V.

With transistor Q2 on, since the output voltage is greater than Vline, reverse current can flow allowing power from the positive side of output capacitor Cout to flow through bypass switch SR1, inductor Lboost, through transistor Q2, through an asymmetrical shunt 106 to the negative side of capacitor Cout. The parasitic capacitors Cds1 and Cds2 are effectively in parallel. The reverse current charges Cds1 to the output voltage, if the value of the reverse current is chosen correctly. Once Cds1 has been charged, transistor Q1 can be soft-switched on with no losses achieving ZVS, since the voltage across Q21 is substantially 0V and the process repeats. Those skilled in the art are knowledgeable as to calculating the value of the reverse current required in order to achieve the goal of soft-switching for transistors Q1 and Q2. Therefore, details of such calculations need not be discussed here.

When the negative cycle of the AC input voltage Vline occurs, the voltage Vline is negative on its right side, (that is where the "−" sign appears in FIG. 1). In operation, totem-pole transistor Q2 is turned on to build current in the inductor in the negative direction. Totem-pole transistor Q1 is off. During the negative portion of the AC input voltage on Vline, bypass device SR2 is turned on and bypass device SR1 is turned off. Current flows from the positive input voltage, through the bypass device SR2, transistor Q2 and through inductor Lboost to the positive terminal of the line voltage supply Vline. Once the inductor current has reached the desired level, the transistor Q2 is turned off. Current continues to flow through the inductor Lboost utilizing the parasitic capacitor Cds1 and the diode CR2 and/or bypass switch SR2 to complete the path, with a small portion of the current going through the body diode BD1, allowing the inductor to discharge into the output capacitor Cout. This will discharge the voltage across the parasitic capacitor Cds1 until it reaches approximately 0V. At this time transistor Q1 can be turned on without switching losses using ZVS, since the voltage across the capacitor Cds1 is approximately 0V.

With transistor Q1 on, since the output voltage is greater than Vline, reverse current can flow allowing power from the positive side of output capacitor Cout to flow through bypass switch SR2, inductor Lboost, through transistor Q1, through a asymmetrical shunt 106 to the negative side of capacitor Cout. The parasitic capacitors Cds1 and Cds2 are effectively in parallel. The reverse current charges Cds2 to the output voltage, if the value of the reverse current is chosen correctly. Once Cds2 has been charged, transistor Q2 can be soft-switched on with no losses achieving ZVS and the process repeats.

It is critical to measure the reverse current accurately in order for this technique to work properly. Measuring the current flow from the converter utilizing a resistor shunt is well known in the art. However, the value of the resistor must be kept very small so that the losses in the forward direction, 6 A in the present example, will be small. The reverse current is much smaller than the forward current which may be, for example, 300 mA in the present example. If a 10 milliohm resistor is utilized for the shunt, for example, then the peak forward voltage drop at peak inductor current of 6 A will be 60 mV. However, with a 300 mA peak reverse current, utilizing the same resistor shunt, yields a detection voltage of only 3 mV. Measuring the reverse current with such a minute signal is challenging and costly. In addition, the comparator must be able to detect the signal amongst the switching noise that may be present in the switching converter, thus exacerbating the problem. This can be solved with the second aspect of the present invention by utilizing an asymmetrical shunt. The shunt 106 comprises a resistor Rshunt and a parallel diode CR_shunt. In the forward direction, current returning to the reference voltage rail 102 through the shunt passes through the diode CR_shunt at relatively low losses. For example, a Schottky diode may be utilized to significantly reduce these losses by—limiting the voltage drop to 0.3 to 0.4V even at the highest forward current levels. For current flowing in the reverse direction, all the current will flow through the resistor Rshunt due to the blocking action of the diode CR_shunt. If a 1 ohm resistor is chosen for the shunt, a 300 millivolt signal will be generated which is much easier to detect utilizing lower-cost comparators. The average power dissipation in the resistor utilizing the scheme would only be 90 mW negligible, since the current flows in the reverse direction only for a short time which is discussed further in conjunction with FIGS. 2D and 4C. One could even raise the value of the resistor to 10 ohms, which would produce a voltage of 3V allowing detection of the reverse current utilizing circuits much less costly than even a low-cost comparator and the dissipation across the shunt would still be insignificant compared to the power that would be dissipated in a 100 milliohm resistor that may be needed to obtain a higher detection voltage and a current of 6 A flowing in the forward direction.

Figure 2A:
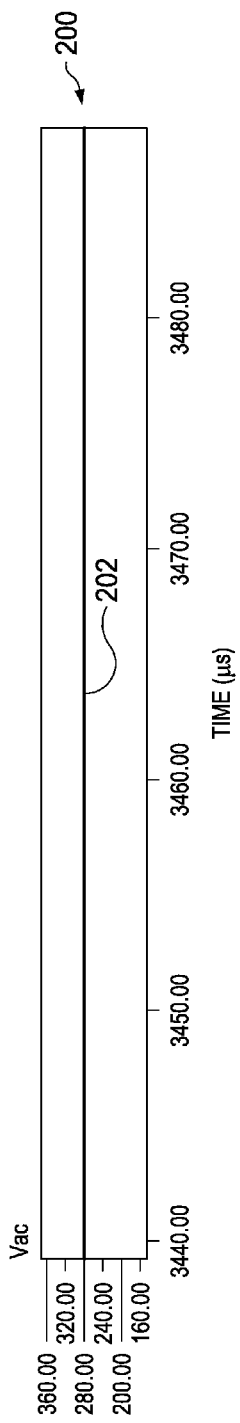
Figure 2B:
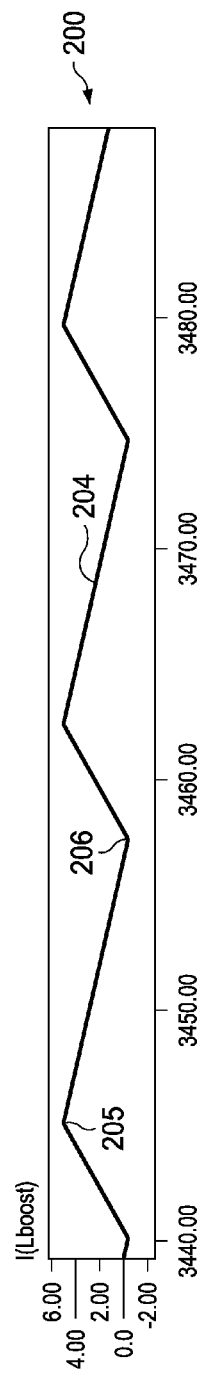
Figure 2C:
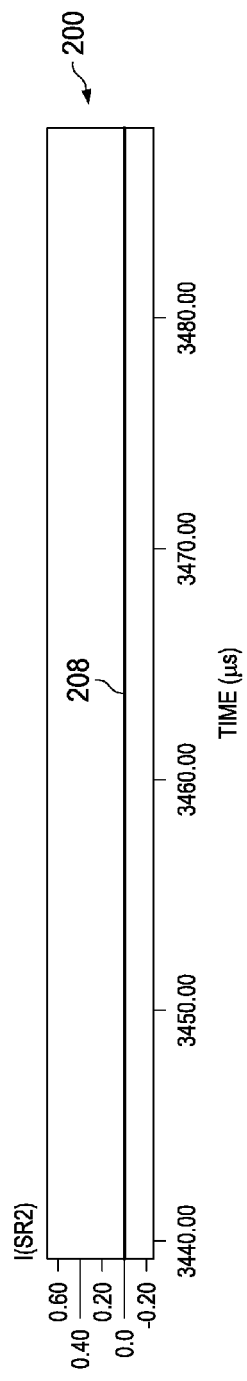

Operation of the circuit shown in FIG. 1 will now be described in more detail utilizing the waveforms shown in FIGS. 2A-2F, 3A-3D, 4A-4F, 5A-5D. The waveforms for operation during the positive portion of the AC cycle are shown in FIGS. 2A-2F generally as 200. FIG. 2A shows the input voltage at 202. This voltage appears as a straight line even though the input voltage is an AC voltage because the line frequency is typically 50 or 60 Hz whereas the switching frequency of the converter may be 100 kHz or more. Thus, the AC input voltage can be viewed as a constant voltage DC source during the short period of time depicted in the drawing. FIG. 2B shows the inductor current of the inductor Lboost 204 which has a positive peak 205 and has a small negative peak 206 which corresponds the reverse current that flows in the inductor at the end of the switching cycle during a positive portion of the line voltage. FIG. 2C shows the current through the second bypass switch SR2. During the positive half of the AC cycle, the bypass switch SR 2 is turned off, so the current therethrough is zero. FIG. 2D shows the current through the first bypass switch SR1 which shows the peaks of current during the negative current flow through the inductor Lboost. The peaks of current 212 correspond to the negative current flowing through Lboost at 206, for example. The waveforms shown in FIG. 2E shows the drive waveforms for transistors Q1 and Q2 at 214, 216, respectively. The circuitry needed to produce the drive waveforms, although not shown in FIG. 1, are well known to those skilled in the art and are well-documented. There-fore, those skilled in the art can produce circuits that generate these signals without the need for further detail herein. FIG. 2F shows the drive signals for the bypass switches SR1 and SR2. Bypass switch SR2 is off during the positive half of the cycle and its drive waveform is shown at 218 to be 0V. During the positive half of the cycle the bypass switch SR1 is on continuously and its drive signal is shown as a positive voltage at 220.

Figure 3A:
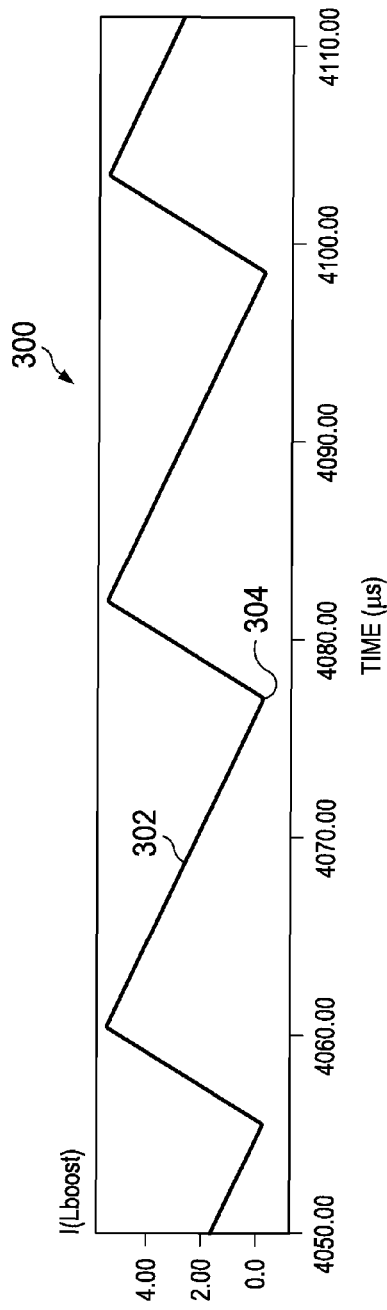
FIGS. 3A-3-D show greater detail of some the waveforms shown in FIGS. 2A-2F.
Figure 3B:
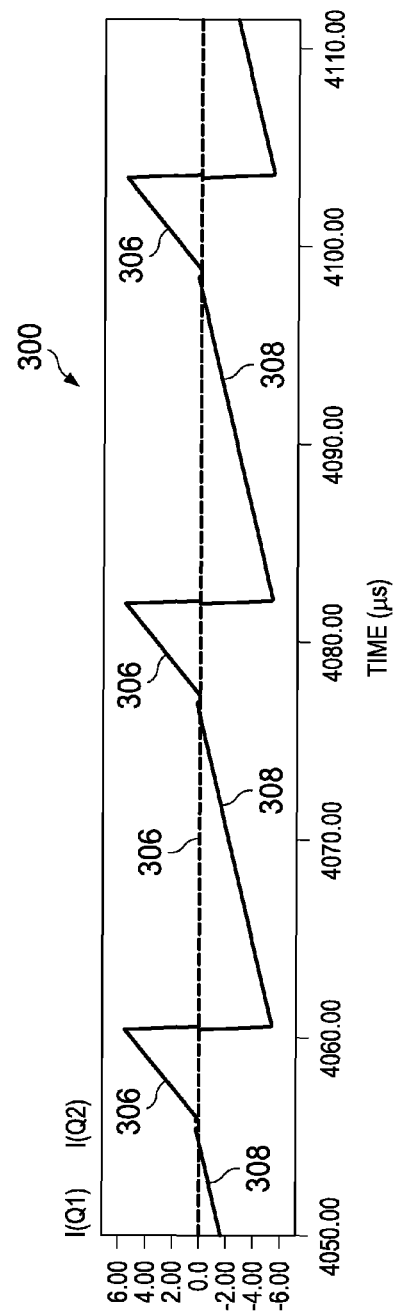
Figure 3C:
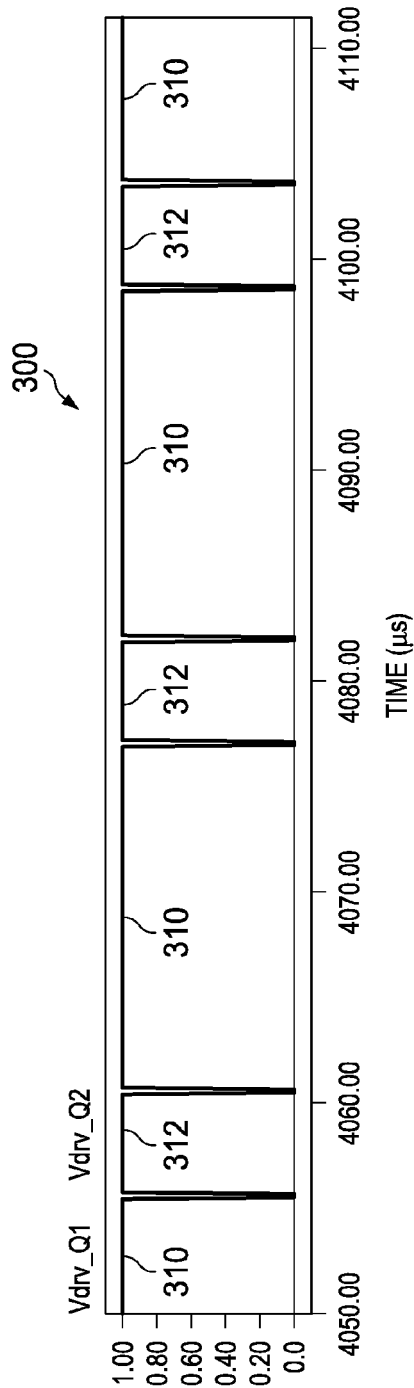
Figure 3D:
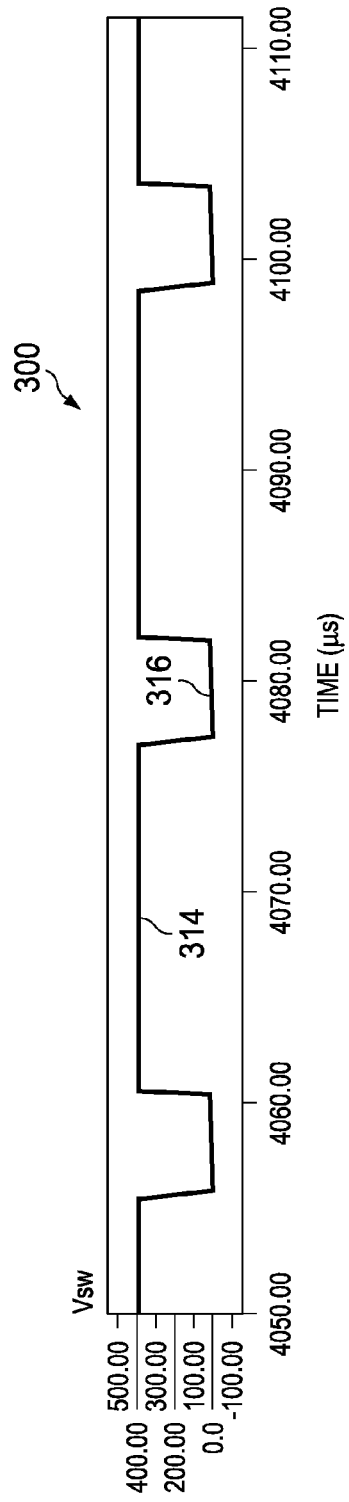

FIGS. 3A-3D show greater detail of some of the waveforms shown in FIGS. 2A-2F, generally as 300. FIG. 3A shows the current through the inductor Lboost at 302 with the negative peak at 304. FIG. 3C shows the drive waveforms for transistors Q1 and Q2 at 312, 310, respectively. The waveforms shown in FIGS. 3A and 3C are duplicated for a reference for the waveforms shown in FIGS. 3B and 3D, due to the timescale change. FIG. 3B shows the current through transistors Q1 and Q2 as 306, 308, respectively. FIG. 3D shows of voltage at the switching node SW at 314 showing substantially zero voltage at the switch node when transistor Q2 is on at 316.

Figure 4D:
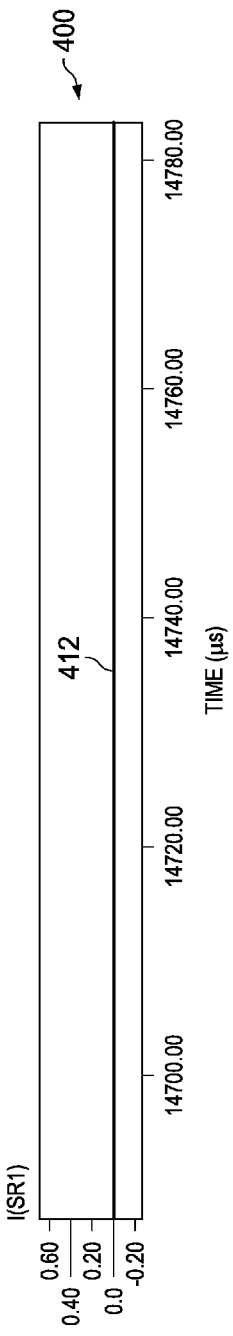
Figure 4E:
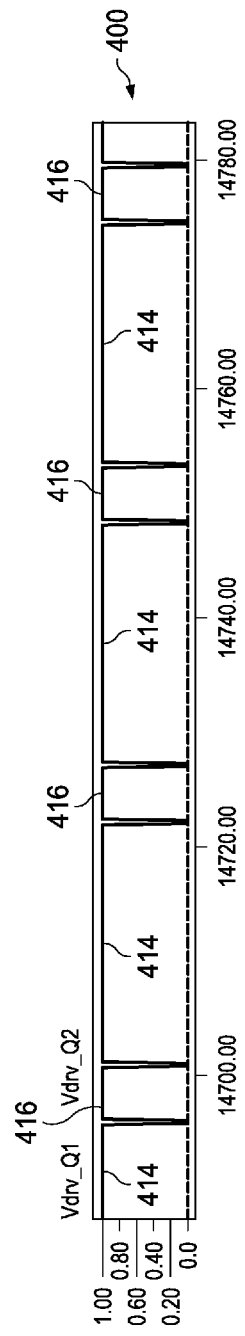
Figure 4F:
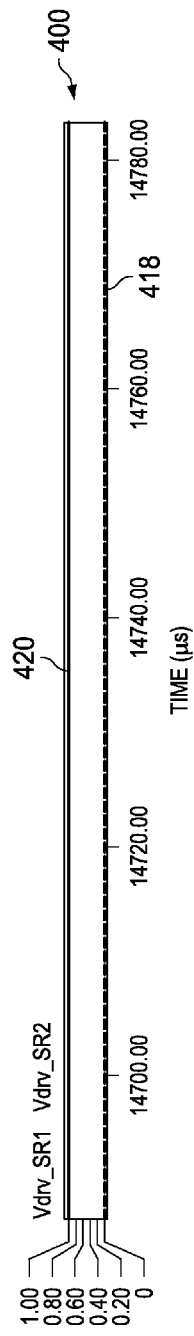

Operation of the circuit shown in FIG. 1 will now be described in more detail utilizing the waveforms for operation during the negative portion of the AC cycle as shown in FIGS. 4A-4F generally as 400. FIG. 4A shows the input voltage at 402. As discussed above with respect to the positive portion of the AC cycle, this voltage appears as a straight line even though the input voltage is an AC voltage because the line frequency is typically 50 or 60 Hz whereas the switching frequency of the converter may be 100 kHz or more. Thus, the AC input voltage can be viewed as a constant voltage DC source during the short period of time depicted in the drawing. FIG. 4B shows the inductor current of the inductor Lboost 404 which has a negative peak 405 and has a small positive peak 406 which corresponds the reverse current that flows in the inductor at the end of the switching cycle during a negative portion of the line voltage. FIG. 4C shows the current through the second bypass switch SR2. During the negative half of the AC cycle, the bypass switch SR2 is turned on, and waveform 406 shows the current peaks at 408. FIG. 4D shows the current through the first bypass switch SR1 which is turned off during the negative half of the cycle, so the current shown is substantially zero. The waveforms shown in FIG. 4E shows of drive waveforms for transistors Q1 and Q2 at 414, 416, respectively. The circuitry needed to produce the drive waveforms, although not shown in FIG. 1, are well known to those skilled in the art and are well-documented. Therefore, those skilled in the art can produce circuits that generate these signals without the need for further detail herein. FIG. 4F shows the drive signals for the bypass switches SR1 and SR2. Bypass switch SR1 is off during the negative half of the cycle and its drive waveform is shown at 418 to be 0 V. During the negative half of the cycle the bypass switch SR2 is on continuously and its drive signal is shown as a positive voltage at 420.

Figure 5A:
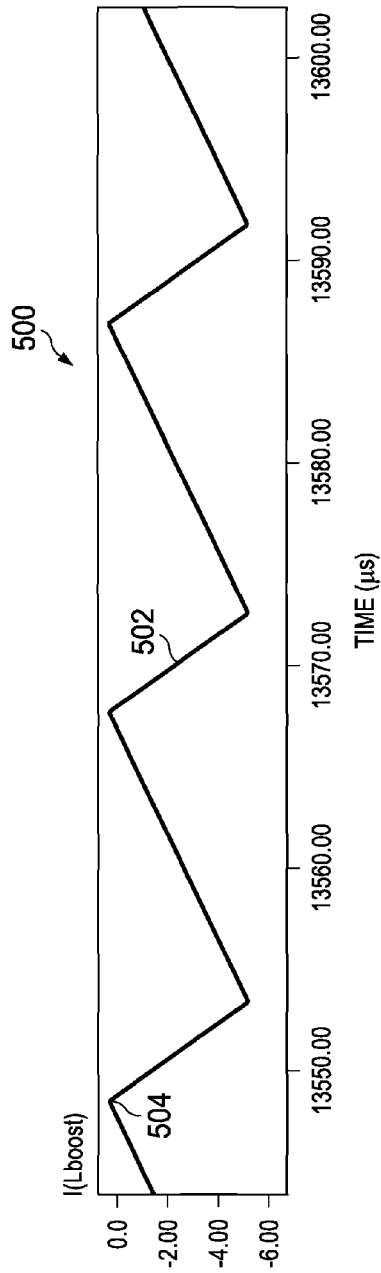
FIGS. 5A-5D show greater detail of some of the waveforms shown in FIGS. 4A-4F.
Figure 5B:
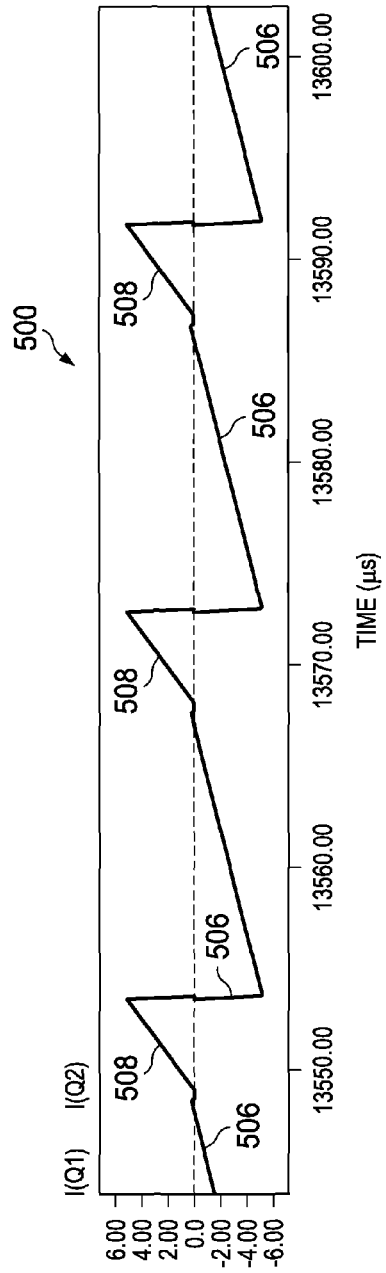
Figure 5C:
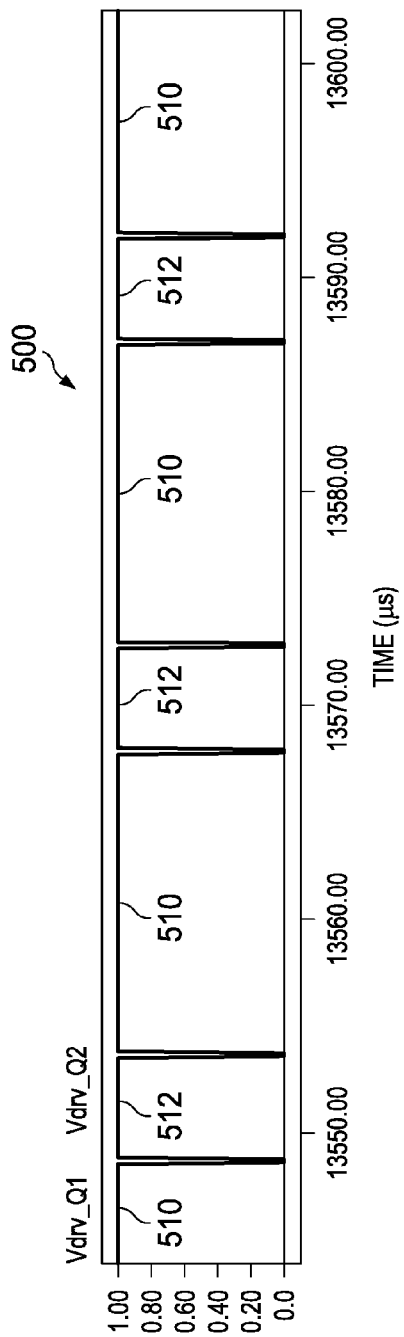
Figure 5D:
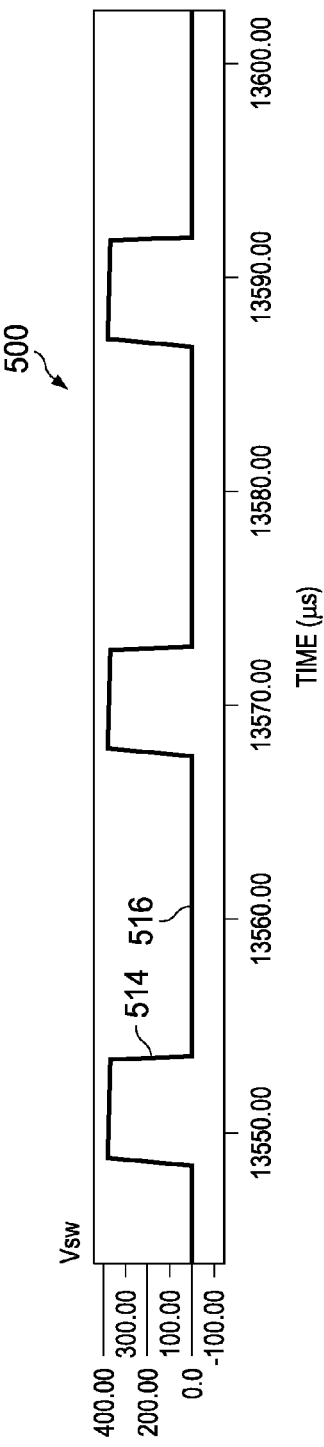

FIGS. 5A-5B show greater detail of some of the waveforms shown in FIGS. 24A-4F, generally as 500. FIG. 5A shows the current through the inductor Lboost at 502 with the positive peak at 504. FIG. 5C shows the drive waveforms for transistors Q1 and Q2 at 510, 512, respectively. The waveforms shown in FIGS. 5A and 5C are duplicated for a reference for the waveforms shown in FIGS. 4B and 4D due to the timescale change. FIG. 5B shows the current through transistors Q1 and Q2 as 506, 508, respectively. FIG. 5D shows of voltage at the switching node SW at 514 showing substantially zero voltage at the switch node when transistor Q1 is on at 516.

Figure 6A:
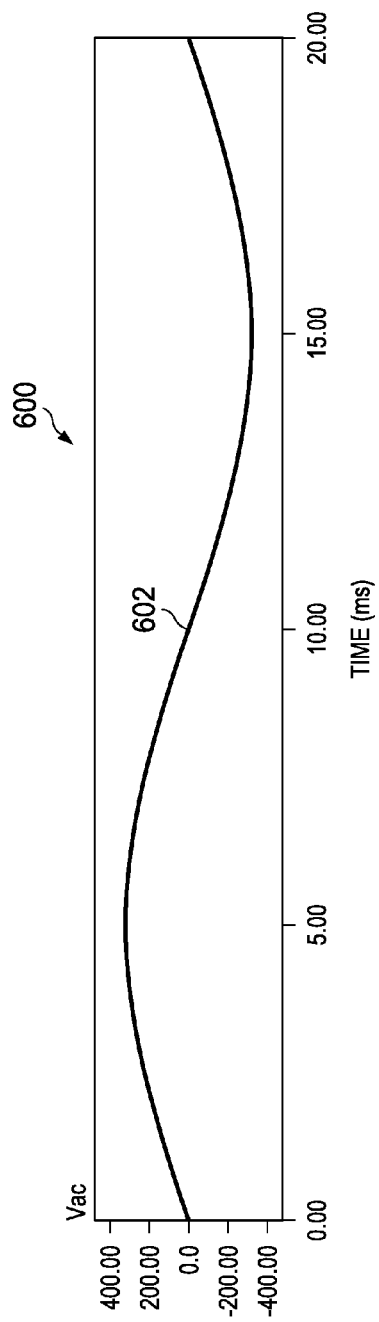
Figure 6B:
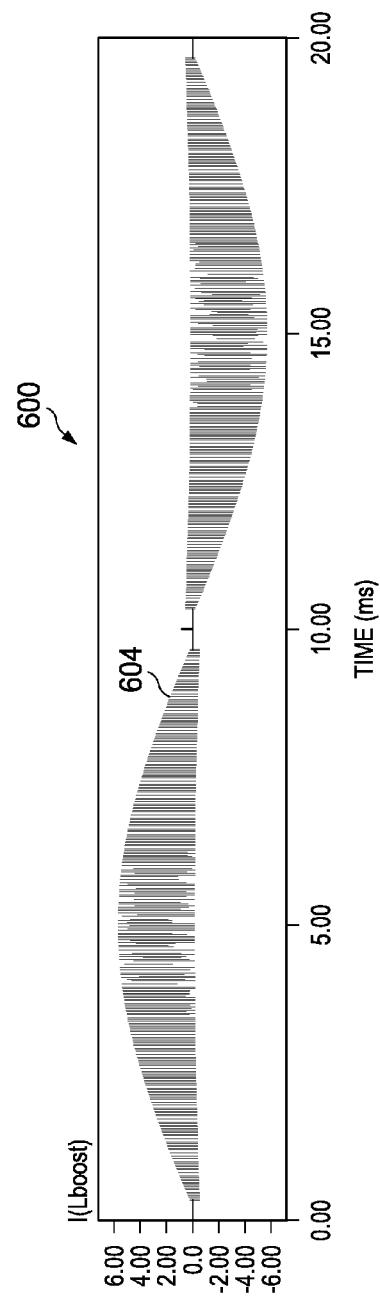
Figure 6C:
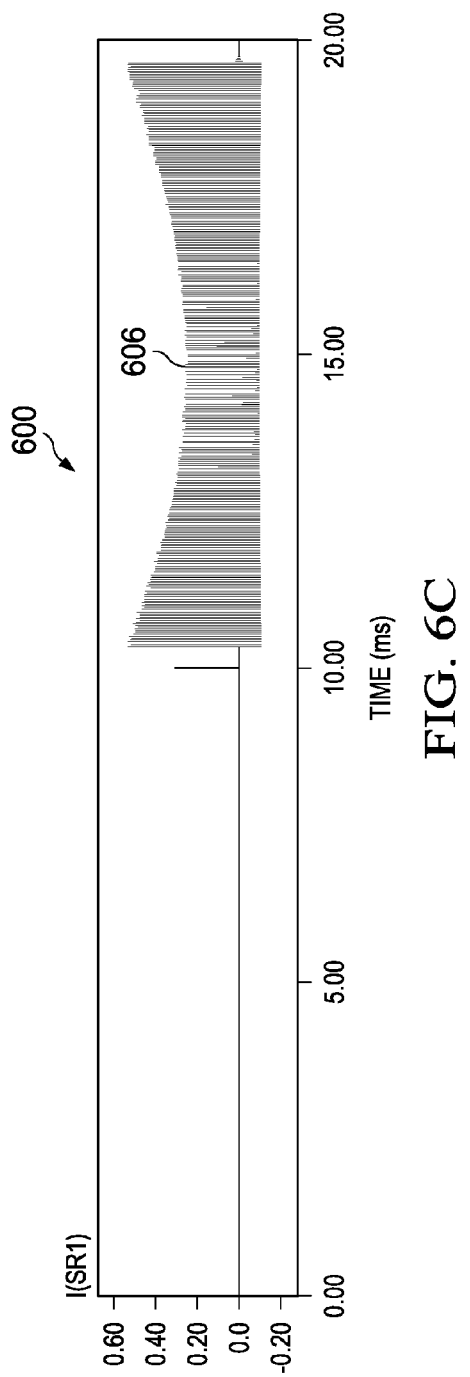
Figure 6D:
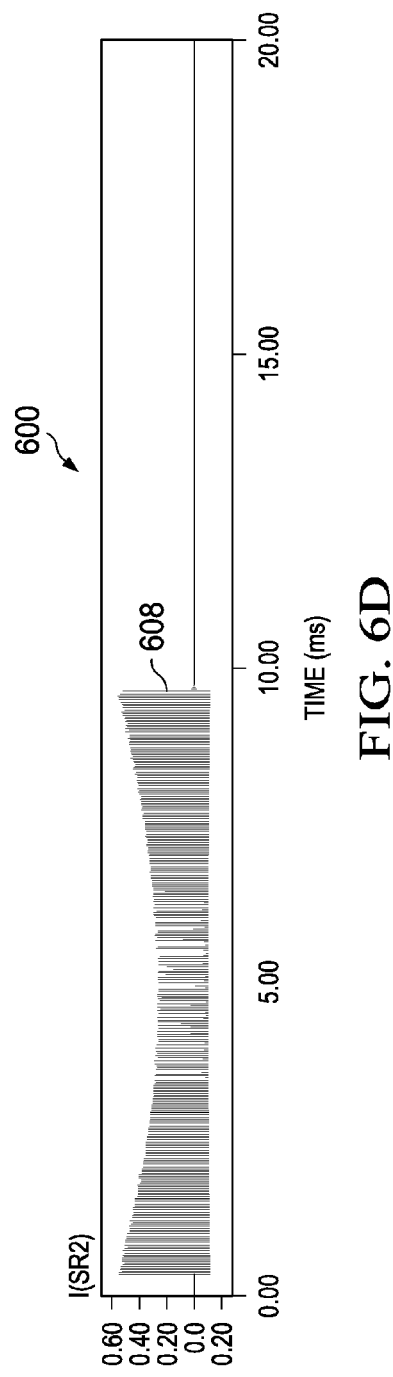

FIGS. 6A-6G show the operating waveforms for the AC-DC converter on a larger scale so that difference in frequency between the line frequency and the switching frequency can be seen. FIG. 6A shows the input AC voltage waveform 602 and a line frequency of 50 Hz. FIG. 6B shows the current through the inductor L boost at 604. FIG. 6C shows the current through bypass switch SR 1 at 606 and FIG. 6D shows the bypass current through the second bypass switch SR2 at 608. The many switching cycles of the switching frequency for the converter compared to the line frequency can readily be seen from these figures. FIG. 6E shows the input current 610. FIGS. 6F and 6G show the current through the switching transistors Q1 and Q2, respectively.

Figure 7:
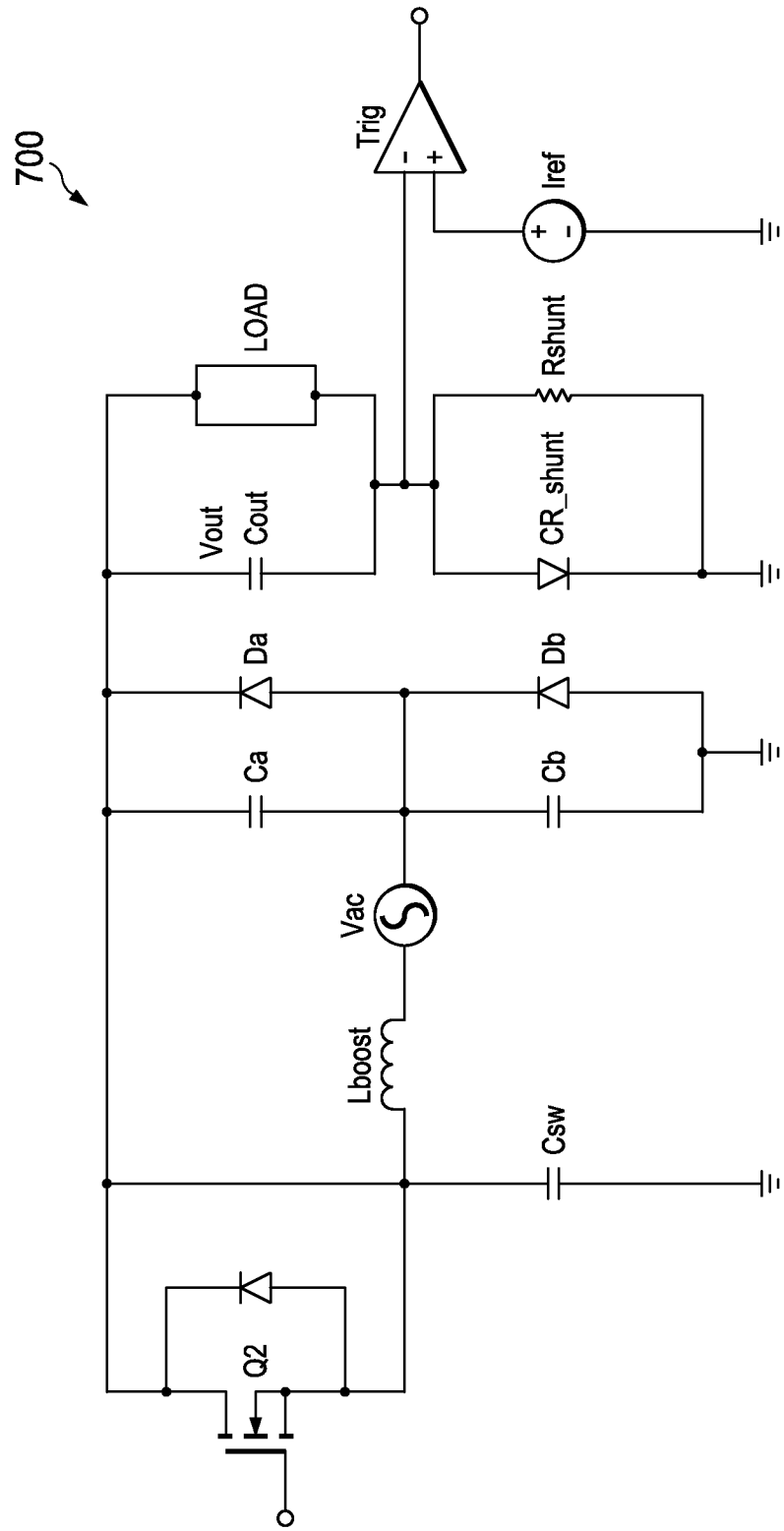
FIG. 7 shows an alternate embodiment of the present invention utilizing capacitors in place of bypass switches.

The circuit can be further simplified by using small capacitors in place of the bypass devices such as the MOSFET switches to supply the reverse inductor current. The modified circuit will operate correctly utilizing capacitors instead of MOSFETs only if no DC current bias is allowed in the boost inductor. The DC bias will tend to build up around the line voltage/current zero crossing and can be avoided by stopping the switching for a few degrees on either side of the zero crossing. The resulting distortion will actually be lower than that appearing with continuous switching. FIG. 7 shows the equivalent circuit utilizing the capacitors prior to Q2 turnoff generally as 700. The circuit is similar to that of FIG. 1 except that the bypass devices (MOSFETs) have been replaced with capacitors Ca and Cb and the circuit shows the trigger circuit TRIG connected to the asymmetrical shunt comprising resistor R shunt capacitor CR_shunt and to a current reference Iref. The capacitors Ca and Cb will be identical in size and can be calculated as follows:

The reverse current 1x in the boost inductor required for achieving ZVS under worst-case conditions ($V_{in}=Vac_{pk}=V_{out}$):

$$I_x = V_{out}/(L_{boost}/C_{SW})^{0.5} \quad (1)$$

No reverse current can be supplied by capacitors $C_a$ and $C_b$ if the input voltage equals the output voltage. Assuming $V_{out}>V_{in}$ by an amount $\Delta V_{min}$:

$$I_x = V_{out}/(L_{boost}/C_{SW})^{0.5} = \Delta V_{min}/(L_{boost}/C_a+C_b)^{0.5} \quad (2)$$

where Vout=output voltage, $C_{SW}$=capacitance at the switch node SW Solving for $C_a+C_b$:

$$C_a+C_b = C_{SW}*(Vout/\Delta V_{min})^2 \quad (3)$$

Although the invention has been described in detail, it should be understood that various changes, substitutions and alterations can be made thereto without departing from the spirit and scope of the invention as defined by the appended claims. For example, although the circuits illustrated using boost converters, this technology can be applied as well to buck and buck-boost converters. The details of such implementations will within the skill of those skilled in the art need and need not be described in detail here.

The invention claimed is:

1. An AC-DC boost converter for power factor correction comprising:
    a totem-pole output circuit having first and second semiconductor switches connected between an output rail and a reference rail, each switch having a channel coupled to a central switching node and having a parasitic capacitance associated with the channel;
    an AC voltage source having a first terminal and a second terminal;
    an inductor having a first terminal connected to the switching node and having a second terminal connected to the first terminal of the AC voltage source;
    a first bypass device connected between the output rail and the second terminal of the AC voltage source;
    a second bypass device connected between the reference rail and the second terminal of the AC voltage source;
    an output capacitor and a load resistance having first terminals connected to the output rail and second terminals connected together;
    a shunt resistor having a first terminal connected to the reference rail and a second terminal connected to the second terminals of the output capacitor and the load resistance; and
    a shunt diode having a cathode terminal connected to the reference rail and an anode terminal connected to the second terminals of the output capacitor and the load resistances.

2. The AC-DC converter of claim 1 in which the bypass devices are semiconductor switches.

3. The AC-DC converter of claim 1 in which the bypass devices are capacitors.

4. The AC-DC converter of claim 1 including a first rectifier diode in parallel with the first bypass device; and a second rectifier diode in parallel with the second bypass device.

5. The AC-DC converter of claim 1 in which the shunt diode is a Schottky diode.

* * * * *